United States Patent

Hornady

(10) Patent No.: US 6,729,815 B2
(45) Date of Patent: May 4, 2004

(54) APPARATUS FOR RESTRAINING PAYLOADS

(76) Inventor: B. C. Hornady, 329 Norwood St., Monroeville, AL (US) 36460

(*) Notice: Subject to any disclaimer, the term of this patent is extended or adjusted under 35 U.S.C. 154(b) by 0 days.

(21) Appl. No.: 09/824,613

(22) Filed: Apr. 2, 2001

(65) Prior Publication Data

US 2001/0022922 A1 Sep. 20, 2001

Related U.S. Application Data

(63) Continuation-in-part of application No. 09/528,779, filed on Mar. 17, 2000, now Pat. No. 6,250,860.

(51) Int. Cl.$^7$ ................................................. B60P 7/08
(52) U.S. Cl. .......................... 410/47; 410/48; 410/50; 410/99; 410/100
(58) Field of Search .............................. 410/96, 97, 99, 410/100, 34, 36, 42, 47, 50; 24/68 CT, 265 CD; 248/499

(56) References Cited

U.S. PATENT DOCUMENTS

| | | | | | |
|---|---|---|---|---|---|
| 2,559,185 A | * | 7/1951 | Carroll | ................... | 410/36 |
| 3,154,026 A | * | 10/1964 | Klasing, Jr. | .................. | 410/41 |
| 3,209,706 A | * | 10/1965 | Broling | ................... | 410/99 |
| 4,257,592 A | * | 3/1981 | Jones | | |
| 4,367,993 A | * | 1/1983 | Meigs | ................... | 410/103 |
| 4,487,537 A | * | 12/1984 | Morse | ................... | 410/47 |
| 4,503,978 A | | 3/1985 | Smit | | |
| 4,526,500 A | * | 7/1985 | Patrick | ................... | 410/48 |
| 5,040,924 A | * | 8/1991 | Kothman | | |
| 5,425,608 A | | 6/1995 | Reitnouer | ................... | 410/49 |
| 5,538,376 A | | 7/1996 | Borda | ................... | 410/99 |
| 6,149,361 A | * | 11/2000 | Schrader | ................... | 410/102 |
| 6,250,860 B1 | * | 6/2001 | Hornady | ................... | 410/47 |
| 6,280,128 B1 | * | 8/2001 | Schrader | ................... | 410/97 |
| 6,315,509 B1 | * | 11/2001 | Nadherny et al. | ................... | 410/116 |

* cited by examiner

Primary Examiner—Stephen T. Gordon
(74) Attorney, Agent, or Firm—Bradley Arant Rose & White LLP; Joel M. Kuchnert; John W. Smith T

(57) ABSTRACT

A device for restraining payloads to a surface, particularly heavy objects being transported by various modes of transportation, such as a flat bed trailer, The device includes a tensionable member with loops at opposite ends that is secured to the front to rear frame Tails which run lengthwise on the underside of a flat bed trailer. The device further includes chains or other restraining elements that are secured to the loops at the opposite extremities of the tensionable member, pass over or through the side rails of the flat bed trailer and over or through the payload. The device also has ratchet binders or other tightening device to achieve tightening of the restraining elements The device, which is relatively light in weight, achieves increased restraint of payloads during transportation without significantly adding to the total weight of the payload.

17 Claims, 4 Drawing Sheets

APPARATUS FOR RESTRAINING PAYLOADS

This is a continuation-in-part of application Ser. No. 09/528,779, filed on Mar. 17, 2000, and issued as U.S. Pat. No. 6,250,860 on Jun. 26, 2001, claims the benefit thereof.

BACKGROUND

The shipping industry is vital to commerce in the United States and in most nations around the world. In particular, the trucking industry is one of the most important branches of this industry. It is estimated that at least thirty to forty percent of all goods transported in the United States are hauled by trucks pulling flat bed trailers. The types of materials and commodities hauled on flat bed trailers vary dramatically. For instance, flat bed trailers are often used to transport heavy equipment, wood products, oil field materials, and steel. Many such goods can be hauled safely and with relative ease of securement to the flat bed trailer. However, some materials present difficulties for those in the shipping industry to transport securely and efficiently.

In particular, various types of payloads are difficult to transport on a flat bed trailer because of their large weight and unconventional shapes. On many occasions, payloads such as timber, steel coils, pipes and other cylindrical objects become dislodged from the bed of trailers despite the best efforts of those responsible for shipping such objects. When these massive loads become loose, there is great risk for property damage and accidents causing injury to persons.

Problems frequently occur because the payload becomes loose as a result of large lateral forces that act on the payload when the vehicle engages in a sharp turn. In addition, a payload can become unsecured over time as the vehicle undergoes routine turns and sustains vibrations and natural swaying forces while traveling great distances over roadways. Further, payloads may shift during transit due to the sudden application of the vehicle's brakes. Payloads can also become loose after the vehicle hauling it reaches a roll over or other extremely unstable situation.

At present, the United States Department of Transportation ("DOT") regulates the trucking industry. Among other things, the DOT places restrictions on the total weight of a vehicle and its payload that can be transported on roadways. For example, under 23 C.F.R. Section 658.17, the maximum gross weight of a vehicle is limited to 80,000 total pounds and 20,000 pounds per axle. Thus, when heavy payloads are being transported, it is important that the mechanisms used to restrain those payloads do not add unnecessary weight to the total payload.

There are presently several devices employed in the trucking industry for securing and shipping heavy payloads. Information relevant to attempts to address these problems can be found in Reitnouer, U.S. Pat. No. 5,425,608; and Borda, U.S. Pat. No. 5,538,376. However, these references suffer from several disadvantages. For instance, the devices rely on the strength of the side rails of the flat bed trailer which are often made of aluminum and have limited capacity to restrain significant weights and forces. The holding chains utilized in these devices can exert forces on the side rails causing the side rails to yield and the chains to become loose. Further, these devices generally do not prevent the payload from becoming unrestrained should the flat bed trailer reach an overturned or other unstable position.

Furthermore, existing devices for restraining payloads also present difficulties in complying with DOT weight limitations. Some devices employ various combinations of holding chains, brackets and tie downs to secure the payload and, as a result, can add significantly to the overall weight of the shipment. The additional weight of these securing devices can result in violations of DOT regulations. This is particularly true where adequate securement of the payload requires multiple securement devices or the device itself requires a large number of heavy holding chains.

This is a continuation-in-part of application Ser. No, 09/528,779, filed on Mar. 17, 2000, and issued as U.S. Pat. No. 6,250,860 on Jun. 26, 2001. Application Ser. No. 09/528,779 claimed and described another invention that has been in use since that time. The general object of the present invention is to provide restraint of heavy payloads under all circumstances, including when the vehicle transporting the payload reaches a turned over or other unexpected position. It is further an object of this invention to provide a securing device that is relatively light in weight. The instant device will not add significantly to the weight of the payload and therefore faacilitates compliance with DOT weight requirements. Further, it is an object of this device to provide a securing device that can be placed at a variety of positions on a vehicle, and, thus, permit the improved restraint of many typos of payloads. It is also an object of this invention to provide a device that is simple to use, thus reducing the risk of human error, and a device that is affordable to manufacture and purchase.

SUMMARY

The present invention is directed to a device that satisfies these needs. The device comprises a tensionable member, such as ungalvanized steel wire rope, with a loop on each end. In the preferred embodiment, the tensionable member is partially encased in a conduit with openings on each end, with said tensionable member extending through and beyond the openings at the ends of the conduit. Said conduit is attachable by connecting means to the front to rear frame rails which run lengthwise on the underside of a vehicle such as a flat bed trailer. These frame rails are generally steel I-beams and provide the primary support for the trailer bed. It is widely known that the frame rails are much stronger than the side rails relied upon by other devices and methods currently used in the industry.

The device further includes a plurality of restraining elements such as transport chains. Said transport chains restrain the payload by passing over or through the payload, by passing over or through the side rails of the flat bed trailer, and by being secured to the tensionable member by passing through the loops at the opposite extremities of the tensionable member. The loops of the tensionable member may be encased in what is commonly referred to in the industry as wire rope thimbles to provide protection against wear and deformation of the loops. Each of said loops may be formed by wrapping a free end of the tensionable member around one of said thimbles and coupling said free end of the tensionable member with a portion of the tensionable member in between the loop and the opening of the conduit. To further secure the coupling, said free end may be crimped against or wrapped around said tensionable member. To achieve still further securement, said coupling may be encased in a durable sleeve. It will be appreciated that said sleeve will provide protection against wear and deformation of the coupling. According to tests performed by the inventor, the load limit of the present invention substantially exceeds the requirements applicable in the industry. At the same time, the total weight of the device is about 45 pounds which is believed to be significantly less than other devices currently used to restrain payloads.

Tightening of said transport chains over the payload and to the tensionable member is achieved by using ratchet binders or other tightening means, such as lever binders or turn buckles. Said tightening means may be located adjacent to the surface of the trailer bed and are therefore more easily accessed by the driver for periodic examination to ensure proper restraint of the payload, thereby achieving advantages over other methods cuffently used.

The present invention can be adapted for use on various types and sizes of flat bed trailers and potentially other vehicles without significant modifications to such vehicles. In addition, the present invention is adjustable and can be used at most any desired location on the flat bed trailer. More than one of the devices may be used on a flat bed trailer to provide additional restraint to the particular payload being hauled. In addition, because it has relatively few parts, the present invention is easy to use and install and is affordable.

BRIEF DESCRIPTION OF THE DRAWINGS

These and other features, aspects and advantages of the present invention will become better understood by reference to the following description, appended claims, and accompanying drawings, where:

DESCRIPTION

Figure 1:
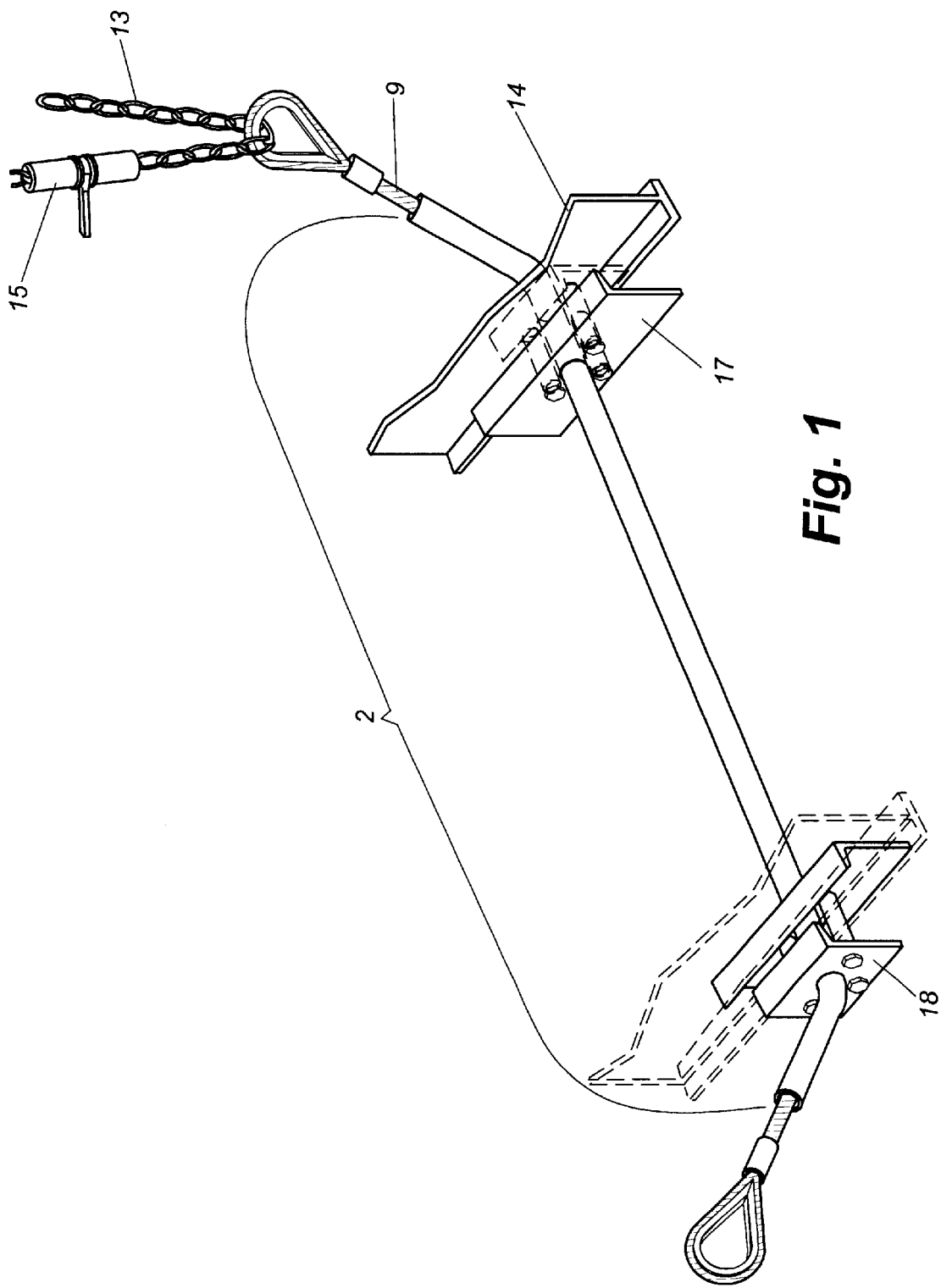
FIG. 1 is a three-dimensional view of the apparatus bolted in place.
Figure 2:
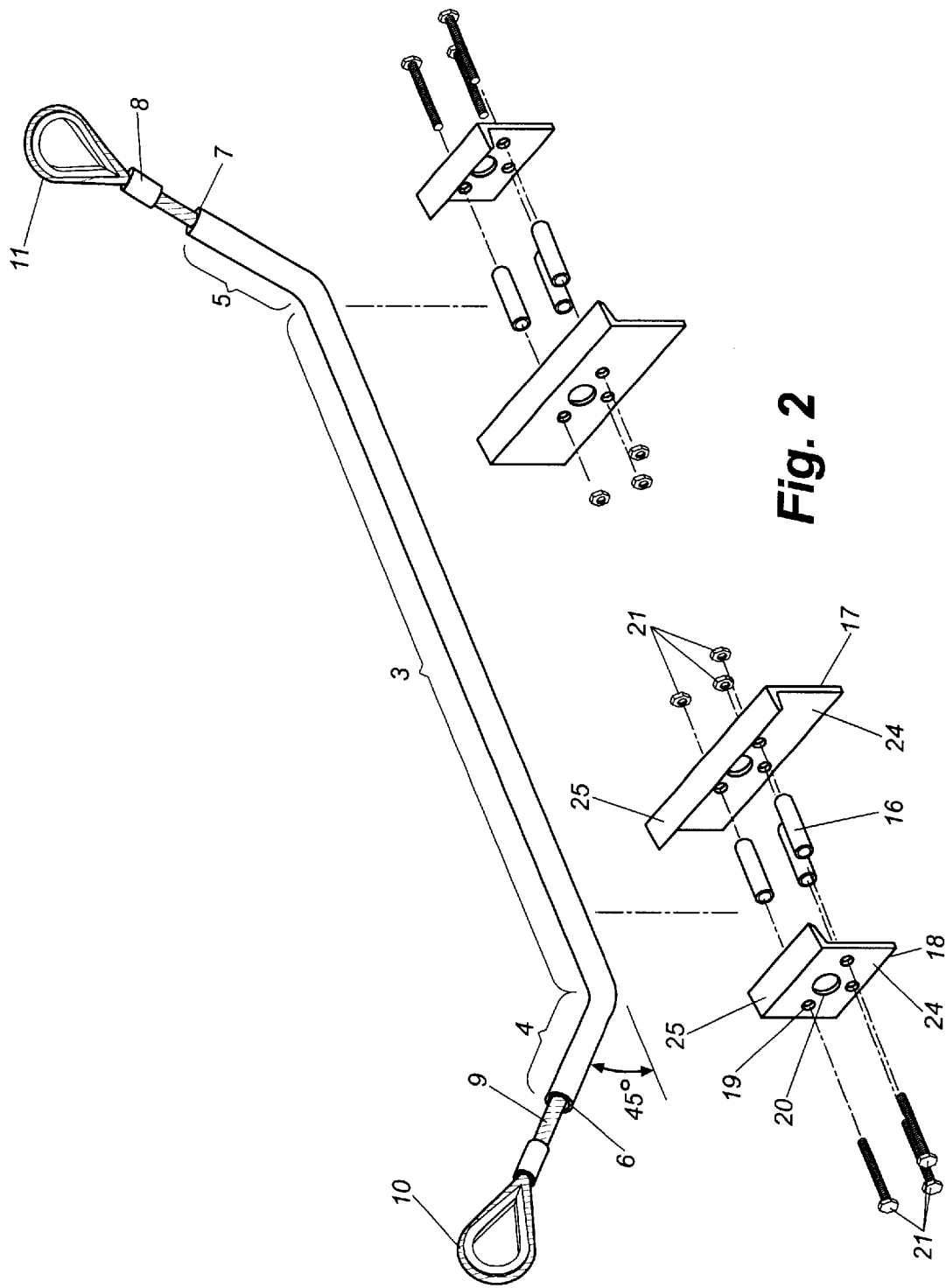
FIG. 2 is an exploded, three-dimensional view of the conduit, tensionable member, plates, and spacers.
Figure 3:
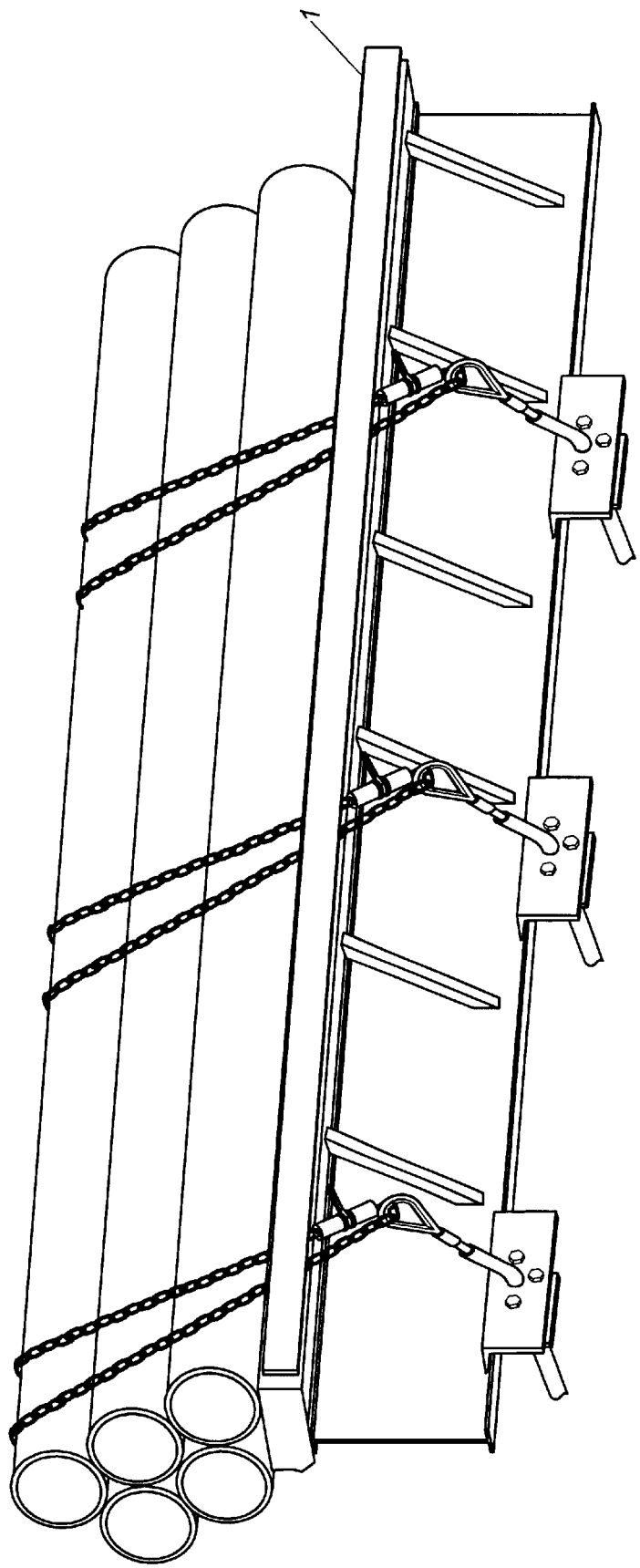
FIG. 3 is a partial three-dimensional view of the present invention in use on a flat-bed trailer.

Referring to FIGS. 1, 2 and 3, the apparatus for securing payloads is illustrated. Although the field of application of the present invention will include various modes of transportation, it is anticipated that the present invention will find its most widespread use in connection with the transportation of heavy payloads on flat bed trailers. The apparatus comprises a conduit 2 that is attachable to the front to rear frame rails 14 which run lengthwise on the underside of a vehicle such as a flat bed trailer, as will be described further below. Said frame rails 14 are generally much stronger than the side rails of flat bed trailers relied upon by other devices and methods currently used in the industry.

As shown most clearly in FIG. 2, conduit 2 comprises an elongated portion 3, with openings 6 and 7 at a first extremity 4 and a second extremity 5, respectively, extending from opposite ends of elongated portion 3. Tensionable member 9 passes through conduit 2 and extends beyond said openings 6 and 7, said tensionable member 9 having an end comprising a first loop 10 and an opposing end comprising a second loop 11. Said ioops 10 and 11 provide a means for connecting said tensionable member 9 to a plurality of restraining elements 13, such as transport chains, ropes, cables, wires or straps, which bind the payload to the surface of the flat bed trailer. In the preferred embodiment, it is recommended that Grade 70 transport chains be utilized to achieve the most effective restraint. It will be appreciated by those skilled in the art of transporting heavy loads that optimum restraint requires utilizing ratchet-type binders 15 or other tightening means, such as lever binders or turn buckles, to tighten said restraining elements 13. It will be further appreciated that said loops 10 and 11 should contain openings sufficient to receive a plurality of said restraining elements 13.

The shape and dimensions of said conduit 2 need not be defined exactly. In the illustrated preferred embodiment, said conduit is of circular cross section of approximately 1¾ inches in dimension. It will be appreciated by those skilled in the art that said elongated portion 3 of conduit 2 should be of sufficient length to span the front to rear frame rails 14 on the underside of the flat bed trailer, and that said first extremity 4 and said second extremity 5 should be of sufficient length to permit the loops of the tensionable member 9 to accommodate said restraining elements 13 without extending beyond the planes defined by the sides of the flat bed trailer. In the illustrated preferred embodiment, said first and second extremities, 4 and 5 respectively, are at an angle to said elongated portion 3 to prevent chafing of said tensionable member 9. It is recommended that the optimum angle is approximately 45 degrees, as shown in FIG. 2. It is further emphasized that conduit 2 can be adaptably sized and shaped to mate with the underside of most any vehicle that may be used for transporting objects.

It will be further appreciated that said conduit 2 should be comprised of material of sufficient strength to permit said conduit to withstand any forces exerted upon it by said tensionable member 9 and to permit said conduit to be connected to frame rails 14 by connecting means. In the preferred embodiment, it is recommended that said conduit 2 is made of at least schedule 40 pipe. It will be appreciated that said conduit 2 may contain grease fittings and weep holes to prevent said tensionable member 9 from rusting.

Similarly, the shape and dimensions of said tensionable member 9 need not be defined exactly. As illustrated in the preferred embodiment, said tensionable member 9 should be of sufficient length to pass through said conduit 2 and extend beyond the openings 6 and 7 of said conduit 2. In the preferred embodiment, said tensionable member should be of sufficient length such that the location of said loops 10 and 11 will be sufficiently below the surface 1 of the flat bed trailer and such that said loops can accommodate said restraining elements 13 without extending beyond the planes defined by the sides of the flat bed trailer. To best mate with most frames of a tractor trailer, it is envisioned that the length of the tensionable member 9 will be approximately 80 inches. However, it is further emphasized that tensionable member 9 can be adaptably sized and shaped to mate with the underside of most any vehicle that may be used for transporting objects.

Said tensionable member 9 may be comprised of any material that provides sufficient durability and strength to withstand the restraining forces necessary to secure a particular payload. Although Applicant recommends the use of at least ⅞ inch ungalvanized steel wire rope for the tensionable member 9, it will be understood that said tensionable member may be a cable, rope, wire, strap, chain, or other material that meets the strength and durability requirements for a particular payload.

It will be further understood by referring to FIG. 3 that, when the device is assembled and in use, the location of said loops 10 and 11 will be sufficiently below the surface 1 of the flat bed trailer, such that there will be a sufficient length of the restraining elements 13 extending from said loops to the surface 1 of the flat bed trailer. This feature of the device permits said ratchet binders 15 to be attached to said restraining elements 13 at a point below the surface 1 of the flat bed trailer, as shown in FIG. 3. Consequently, utilization of the present invention results in superior accessability to the ratchet binders 15 by the individuals responsible for assuring the proper restraint of the payload. It will be further understood that such accessability will exist whether or not the payload is covered.

Figure 4:
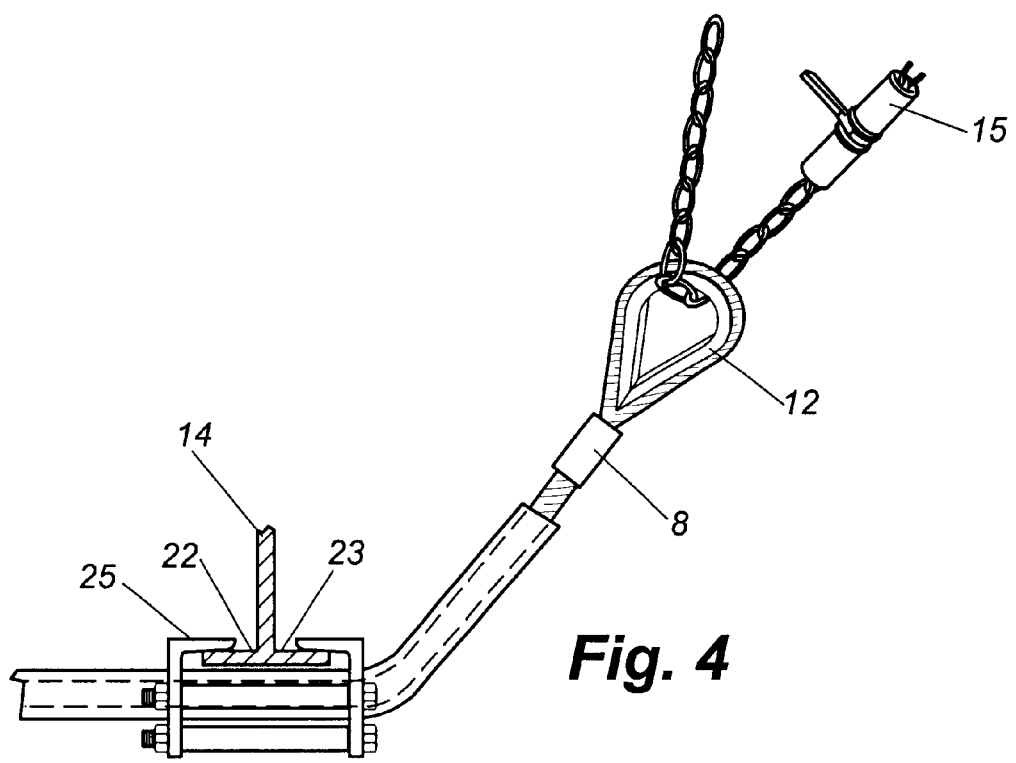
FIG. 4 is a partial side view of the apparatus bolted in place.

As best depicted in FIG. 4, said loop 11 may be formed by wrapping a free end of the tensionable member around a wire rope thimble 12 and coupling the free end of the tensionable member with the a portion of the tensionable member in between said loop 11 and said opening 7 of the conduit 2. It will be further appreciated that said coupling can be further secured by encasing said coupling in a durable sleeve 8.

The apparatus is further comprised of a means for connecting said conduit 2 to the front to rear frame rails 14 which run lengthwise on the underside of the flat bed trailer or other vehicle as will now be further explained. In the preferred embodiment, referring now to FIG. 2, said means comprises an interior L-shaped plate 17 and an exterior L-shaped plate 18, said L-shaped plates each having a base 24 and a flange 25, with the base of each of said L-shaped plates having at least one matching bolt hole 19 and a matching aperture 20. Said conduit 2 passes through said aperture 20 in said plates 17 and 18 and is secured in position by bolting means 21.

Referring to FIGS. 1, 2, and 4, front to rear frame rails 14 are steel I-beams having an interior lower lip 22 and an exterior lower lip 23 of generally uniform thickness protruding in perpendicular fashion from opposing sides of said frame rails 14. Said interior plate 17 is positioned on said interior lip 22 and said exterior plate 18 is positioned on said exterior lip 23 such that flanges 25 of interior plate 17 and exterior plate 18, clamp onto said lower lips 22 and 23, respectively, as the interior plate 17 and exterior plate 18 are tightened by said bolting means 21. It will be appreciated that, upon assembly, said conduit 2 is secured to the underside of said frame rail 14, providing stabilizing support for plates 17 and 18 upon tightening of bolting means 21. Said bolting means 21 must be of sufficient length to extend through said plates 17 and 18. In the preferred embodiment, spacers 16 may be used to encase the portion of said bolting means 21 in between said plates 17 and 18 to maintain a proper distance between said plates 17 and 18 as they are tightened.

It is further envisioned that in the preferred embodiment, the surfaces of conduit 2 and the flanges 25 are knurled or otherwise coarsened to provide additional frictional forces upon tightening by bolting means 21. It is also anticipated that other means can be developed to achieve clamping of plates 17 and 18 on lips 22 and 23.

It will be appreciated that because said conduit 2 passes through said matching aperture 20 in plates 17 and 18 and is not permanently affixed to said plates 17 and 18, said plates 17 and 18 can be adjusted to secure said conduit 2 to said frame rail 14 at most any position on said conduit 2. Consequently, it will be appreciated that the present invention is able to be adapted to various sizes and spacing of trailer frame rails with relative ease. It will be further appreciated that, when attached and tightened, said plates 17 and 18 reduce the risk of slippage or movement of the apparatus in relation to the trailer bed.

It will also be appreciated that said conduit 2 need not be a single continuous member. A plurality of conduits, which only encase the portions of the tensionable member 9 that would otherwise come into contact with frame rails 14 may be used.

Having described the basic concept of the present invention, it will be understood by those skilled in the art that the foregoing detailed disclosure is intended to be presented by way of example only, and is not limiting. Various alterations, improvements and changes will occur and are in the scope of the present invention. Accordingly, the present invention is limited only by the following claims and equivalents thereto.

What is claimed is:

1. An apparatus for restraining payloads, said apparatus comprising:

(a) a conduit having first and second openings at said conduit's extremities;

(b) a tensionable member passing through said conduit, said tensionable member having a first end forming a first loop and a second end forming a second loop, said first and second ends of said tensionable member extending beyond said openings of said conduit;

(c) a means for securing said conduit to an underside support structure of a vehicle.

2. The apparatus of claim 1, wherein said means for securing said conduit to the underside support stnicture of a vehicle comprise a plurality of plates, said plates having at last ona apcrturc for receiving said conduit, said plates boing slidably attachable to said underside support structure by a fastening means.

3. The apparatus of claim 2 wherein each of said plates further comprises a flange protruding at an approximate right angle from an edge of said plate, said flange being of sufficient width to permit interfacing with a lip of said underside support structure.

4. The apparatus of claim 3 wherein each of said plates further comprises at least one hole for receiving said fastening means.

5. The apparatus of claim 3 further comprising at least one spacer, said spacer to encase said fastening means between said plates.

6. The apparatus of claim 1 further comprising a plurality of restraining elements attached to said first and second loops.

7. The apparatus of claim 6 wherein said restraining elements are selected from the group consisting of transport chains, ropes, cables, wires, and straps.

8. The apparatus of claim 7 further comprising a tightening means for tightening said restraining elements.

9. The apparatus of claim 8 wherein said tightening means is selected from the group consisting of ratchet binders, lever binders, and turn buckles.

10. The apparatus of claim 1 further comprising a first protective encasement at least partially enclosing said first loop and a second protective encasement at least partially enclosing said second loop.

11. The apparatus of claim 10 wherein said first and second protective encasements are a first wire rope thimble and a second wire rope thimble.

12. The apparatus of claim 11 wherein said first loop is secured by wrapping the first end of the tensionable member around said first wire rope thimble and coupling said first end with said tensionable member, and said second loop is secured by wrapping the second end of the tensionable member around said second wire rope thimble and coupling said second end with said tensionable member.

13. The apparatus of claim 12 further comprising a first sleeve encasing said coupled first end and a second sleeve encasing said coupled second end.

14. The apparatus of claim 1 wherein said extremities of said conduit extend at angles from said conduit.

15. The apparaus caim 14 wherein said angles are each about 45 degrees.

16. The apparatus of claim 1 wherein said tensionable member is selected from the group consisting of a cable, rope, wire, strap, and chain.

17. The apparatus of claim 1 wherein said tensionable member is ⅞" ungalvanized steel wire rope.

* * * * *